Figure 1:
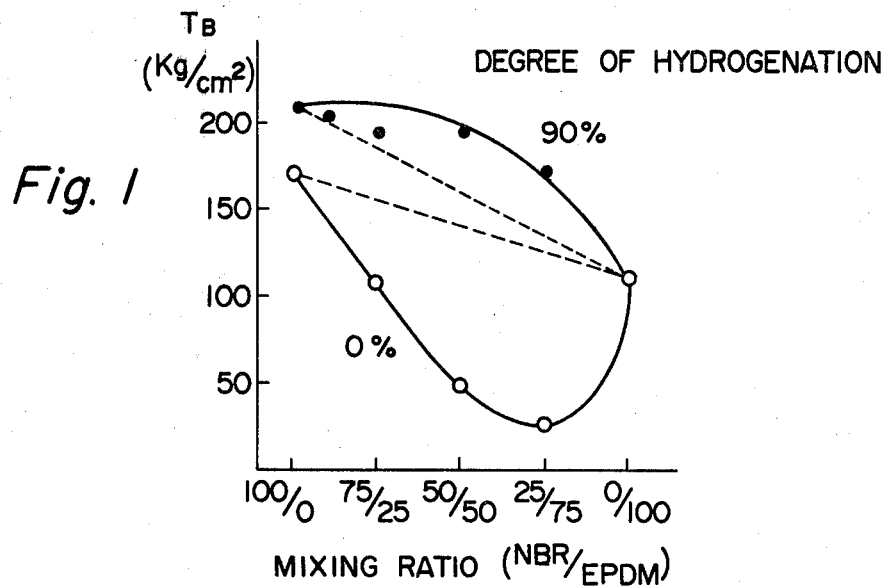

United States Patent [19]

Oyama et al.

[11] 4,405,756

[45] Sep. 20, 1983

[54] CO-VULCANIZABLE RUBBER COMPOSITION

[75] Inventors: Motofumi Oyama, Yokosuka; Kinro Hashimoto, Yokohama, both of Japan

[73] Assignee: Nippon Zeon Co., Ltd., Tokyo, Japan

[21] Appl. No.: 411,586

[22] Filed: Aug. 25, 1982

[30] Foreign Application Priority Data

Sep. 2, 1981 [JP] Japan .............................. 56-138212

[51] Int. Cl.³ .............................................. C08L 9/02
[52] U.S. Cl. .................................... 525/237; 525/191; 525/194
[58] Field of Search ................ 525/236, 237, 194, 191

[56] References Cited

U.S. PATENT DOCUMENTS 3,798,190 3/1974 Yoshimoto et al. ................ 525/237
4,008,190 2/1977 Taylor et al. ....................... 525/237

*Primary Examiner*—J. Ziegler
*Attorney, Agent, or Firm*—Sherman & Shalloway

[57] ABSTRACT

A rubber composition co-vulcanizable with a sulfur cure system, said composition comprising
(1) 95 to 20% by weight of a partially hydrogenated unsaturated nitrile-conjugated diene copolymer rubber in which at least 50% of units derived from the conjugated diene are hydrogenated,
(2) 5 to 80% by weight of an ethylenepropylene-non-conjugated diene terpolymer rubber, and
(3) a required amount of at least one vulcanization accelerator selected from the group of thiuram accelerators and dithiocarbamate accelerators.

5 Claims, 2 Drawing Figures

CO-VULCANIZABLE RUBBER COMPOSITION

This invention relates to a rubber composition co-vulcanizable with a sulfur cure system, comprising a partially hydrogenated unsaturated nitrile-conjugated diene copolymer rubber, an ethylene-propylene-nonconjugated diene terpolymer rubber and a thiuram accelerator or a dithiocarbamate accelerator.

Generally, it is the wide practice in the rubber industry to mix at least two different kinds of rubber in an attempt to obtain a rubber material having the characteristics of the individual rubber components. Frequently, vulcanization of a mixture of dissimilar rubbers which differ greatly in chemical and physical properties does not result in a rubber composition having satisfactory tensile strength under service conditions.

One example is a combination of an acrylonitrile-butadiene copolymer rubber and an ethylene-propylene-nonconjugated diene terpolymer rubber (to be sometimes abbreviated EPDM hereinafter). Efforts have been made to obtain a rubber composition having excellent oil resistance, heat resistance and ozone resistance by blending acrylonitrile-butadiene rubber having excellent oil resistance and ethylene-propylene-nonconjugated diene terpolymer rubber having excellent heat-aging resistance and ozone resistance, but it has been difficult to obtain a satisfactory rubber composition having practical mechanical strength in the cured state.

One cause is its lack of co-vulcanizability. The solubilities of a vulcanizing agent in the individual rubber phases and the rates of vulcanization in the individual rubber phases differ from each other. If optimal vulcanizing conditions for one rubber phase are employed, another rubber phase is scarcely vulcanized or overcured. The resulting cured product shows mechanical strength much lower than additivity and cannot be used for practical purposes.

Much recent work on the problem of vulcanization led to the discovery of a so-called co-vulcanizing agent and thus in a vulcanized rubber having considerably high tensile strength. But the tensile strength attained is not sufficient.

Another cause is the difficulty of uniform dispersing. The acrylonitrile-butadiene copolymer rubber and the ethylene-propylene-nonconjugated diene terpolymer rubber have solubility parameters which are remotest from each other among combinations of rubbers. Hence, they have poor compatibility with each other, and it is difficult to mix them and disperse them uniformly. In an attempt to remove this defect, improvements have been made on the mixing techniques, for example in the kneading conditions. But such improvements have not proved to be satisfactory because, for example, the quality of the product is not constant.

We have made assiduous investigations in order to solve the above problems, and found that if a mixture of a partially hydrogenated unsaturated nitrile-conjugated diene copolymer rubber and an ethylene-propylene-nonconjugated diene terpolymer rubber is cured with sulfur using a thiuram or dithiocarbamate vulcanization accelerator, there can be obtained a cured rubber having the characteristics of the two rubbers such as excellent oil resistance and ozone resistance and surprisingly showing higher tensile strength and heat aging resistance than additivity brought about by the mixing of the two rubbers.

Thus, according to this invention, there is provided a rubber composition vulcanizable with sulfur, comprising (1) 95 to 20% by weight of a partially hydrogenated unsaturated nitrile-conjugated diene copolymer rubber in which at least 50% of units derived from the conjugated diene are hydrogenated, (2) 5 to 80% by weight of an ethylene-propylene-nonconjugated diene terpolymer rubber, and (3) a required amount of at least one vulcanization accelerator selected from the group consisting of thiuram accelerators and dithiocarbamate accelerators.

The partially hydrogenated unsaturated nitrile-conjugated diene copolymer rubber used in this invention is obtained by treating an unsaturated nitrile-conjugated diene copolymer rubber produced by emulsion polymerization, solution polymerization, etc. by an ordinary method (for example, the methods described in British Pat. Nos. 1,198,195 and 1,558,491) to hydrogenate units derived from the conjugated diene. The copolymer rubber to be hydrogenated is a copolymer of an unsaturated nitrile such as acrylonitrile or methacrylonitrile and at least one conjugated diene such as 1,3-butadiene, isoprene, or 1,3-pentadiene. A part of the conjugated diene may be replaced by an unsaturated carboxylic acid such as acrylic acid, methacrylic acid, fumaric acid or itaconic acid, an ester of the unsaturated carboxylic acid, such as its methyl, butyl or 2-ethylhexyl ester, or an N-methylol acrylamide such as N-methylolacrylamide. Examples of suitable copolymer rubbers are an acrylontrile-butadiene copolymer rubber, an acrylonitrile-isoprene copolymer rubber, an acrylonitrile-butadiene-isoprene copolymer rubber, and an acrylonitrile-butadiene-methyl acrylate copolymer rubber. The acrylonitrile-butadiene copolymer rubber is most suitable. The amount of the bound unsaturated nitrile in the copolymer rubber is not critical, and is usually 10 to 60% by weight. The degree of hydrogenation of the conjugated diene units in the copolymer rubber is at least 50%, preferably 70 to 98%. If it is less than 50%, there is only a slight improvement in tensile strength and heat resistance.

EPDM used in this invention is preferably a terpolymer rubber composed of 20 to 90% by weight of ethylene, 10 to 80% by weight of propylene and 2 to 25% by weight of a nonconjugated diene. Examples of nonconjugated dienes generally used are dicyclopentadiene, methyltetrahydroindene, methylene norbornene, ethylidene norbornene, and 1,4-hexadiene. Ethylene norbornene and dicyclopentadiene are especially suitable in this invention. Desirably, EPDM obtained by using dicyclopentadiene as the nonconjugated diene has an iodine value of at least 20.

The rubber composition of this invention suitably contains 95 to 20% by weight of the partially hydrogenated unsaturated nitrile-conjugated diene copolymer rubber and 5 to 85% by weight of EPDM. If the proportions of these rubbers are outside the specified ranges, the characteristics of the resulting composition will be lost.

In order to achieve the object of this invention, the above rubber components should be cured with sulfur using at least one vulcanization accelerator selected from the group consisting of thiuram accelerators and dithiocarbamate accelerators. Other vulcanization accelerators may be used in combination with these vulcanization accelerators. The object of this invention cannot be achieved when only the other accelerators are used.

Examples of the thiuram accelerators used in this invention include tetramethylthiuram monosulfide, tetramethylthiuram disulfide, tetraethylthiuram disulfide, tetrabutylthiuram disulfide, dipentamethylenethiuram tetrasulfide, and dipentamethylenethiuram hexasulfide.

Examples of the dithiocarbamate accelerators include zinc dimethyldithiocarbamate, zinc diethyldithiocarbamate, zinc di-n-butyldithiocarbamate, zinc ethylphenyldithiocarbamate, sodium diethyldithiocarbamate, copper dimethyldithiocarbamate and iron dimethyldithiocarbamate.

The amount of the vulcanization accelerator may be properly determined according to the types and amounts of sulfur, the other accelerator and vulcanization aids so that optimal vulcanizate properties can be obtained. Usually, it is 0.1 to 10 parts by weight, preferably 0.5 to 5 parts by weight, per 100 parts by weight of the rubber components (partially hydrogenated NBR plus EPDM).

Illustrative of sulfur used in this invention are elemental sulfur and sulfur donor vulcanizers such as morpholine disulfide and the above-mentioned thiurams.

The other vulcanization accelerators may be those normally used, for example thiazole accelerators such as 2-mercaptobenzothiazole, and zinc salt of 2-mercaptobenzothioazole, and guanidine accelerators such as diphenyl guanidine.

Zinc oxide and stearic acid are typical examples of the vulcanization aids.

The composition of this invention can be prepared by mixing the partially hydrogenated unsaturated nitrile-conjugated diene copolymer rubber, EPDM, the thiuram and/or dithiocarbamate accelerator, sulfur and a vulcanization aid and as required, another vulcanization accelerator, a reinforcing agent (such as carbon black and silica), a filler (such as calcium carboate), a plasticizer, and an antioxidant by using a mixer such as a roll or a Banbury mixer. Needless to say, the composition of this invention is not restricted in any way by a method of its preparation.

Since the composition of this invention has covulcanizability and gives a vulcanized product having excellent oil resistance, ozone resistance, heat resistance and mechanical strength, it can be used for the production of known rubber products requiring oil resistance, heat resistance, ozone resistance and mechanical strength, such as automotive brake hoses, automotive radiator hoses, transmission belts, conveyor belts, sheets and rolls.

The following examples and the attached drawings illustrate the present invention more specifically.

Figure 2:
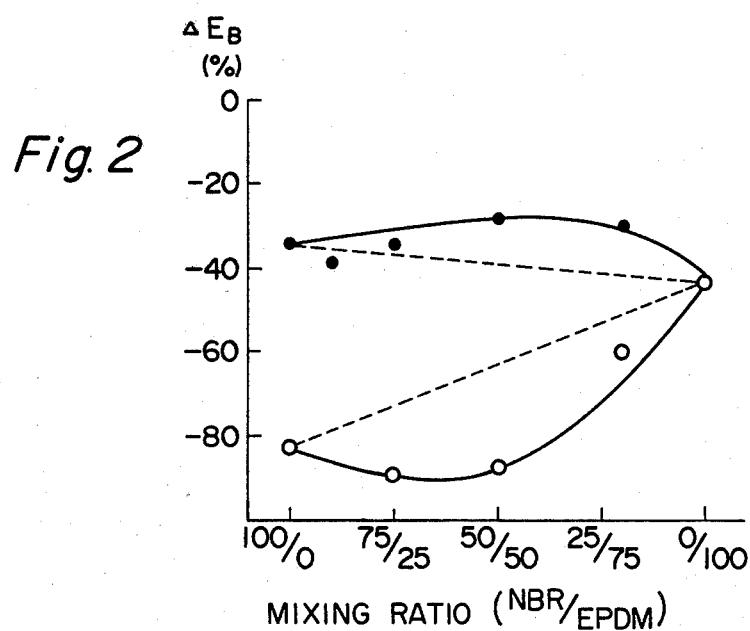

In the accompanying drawings, FIGS. 1 and 2 are graphs prepared on the basis of the data in Example 1 in order to demonstrate the unexpected results of the present invention.

The degrees of hydrogenation of the conjugated diene units in the copolymer rubbers which are shown in the examples are expressed in mole% determined by the iodine value method.

EXAMPLE 1

An acrylonitrile-butadiene copolymer rubber having a bound acrylonitrile content of 41% by weight (to be abbreviated NBR hereinafter) was dissolved in methyl isobutyl ketone, and partially hydrogenated in an autoclave using Pd-carbon (5% by weight of Pd) as a catalyst to prepare a partially hydrogenated NBR.

The partially hydrogenated NBR and EPDM (MITSUI-EPT 4070, a tradename for a product of Mitsui Petrochemical Industries, Ltd.; the nonconjugated diene component was ethylidene norbornene) were mixed on a cold roll together with compounding agents in accordance with the compounding recipe of Table 1 to form a rubber compound stock. The stock was heated at 160° C. for 20 minutes to prepare a vulcanizate.

The properties of the vulcanizate were measured in accordance with JIS K-6301. The static resistance test was carried out at a temperature of 40° C. in an ozon concentration of 40 pphm while giving a 20% stretch to the sample. The dynamic ozone resistance test was carried out by giving a repeated stretching of 0 to 20% to the sample in the same atmosphere as used in the static ozone resistance test.

The state of crack formation was evaluated on the following criteria in accordance with JIS K-6301.

| Number of cracks | Size and depth of cracks |
| --- | --- |
| A: Small | 1: Not visible with unaided eyes, but can be observed by a magnifying glass (10×). |
| B: Large | 2: Can be observed with unaided eyes. |
| | 3: The cracks are deep and relatively large (less than 1 mm) |
| | 4: The cracks are deep and large (at least 1 mm but less than 3 mm). |
| C: Innumerable | 5: Cracks with a size of at least 3 mm, or the cracks are about to cause cracking of the sample. |

Note:
The state of crack occurrence is expressed by combining the number of cracks and the size and depth of cracks. NC means that no crack formed, as A-1, B-5, etc.

TABLE 1

| Compounding recipe | |
| --- | --- |
| A mixture of the partially hydrogenated NBR and EPDM (in the mixing ratios shown in Table 2) | 100 (parts by weight) |
| Stearic acid | 1 |
| Zinc oxide | 5 |
| Sulfur | 0.5 |
| SRF carbon black | 40 |
| Tetramethylthiuram disulfide | 1.5 |
| Cyclohexylbenzothiazyl sulfenamide | 1.5 |

TABLE 2

| | Run No. | | | | | | | | | |
| --- | --- | --- | --- | --- | --- | --- | --- | --- | --- | --- |
| | Comparison | | | | | Invention | | | | |
| Test item | 1 | 2 | 3 | 4 | 5 | 6 | 7 | 8 | 9 | 10 |
| NBR (degree of hydrogenation 0%) | 100 | 75 | 50 | 25 | 0 | | | | | |
| NBR (degree of hydrogenation 90%) | | | | | | 100 | 90 | 75 | 50 | 25 |
| EPDM | 0 | 25 | 50 | 50 | 100 | 0 | 10 | 25 | 50 | 75 |
| Tensile strength (kg/cm$^2$) | 172 | 108 | 50 | 25 | 112 | 211 | 205 | 195 | 195 | 173 |
| Elongation (%) | 400 | 350 | 260 | 330 | 380 | 450 | 420 | 430 | 440 | 440 |

TABLE 2-continued

| | Run No. | | | | | | | | | |
|---|---|---|---|---|---|---|---|---|---|---|
| | Comparison | | | | | | Invention | | | |
| Test item | 1 | 2 | 3 | 4 | 5 | 6 | 7 | 8 | 9 | 10 |
| 100% tensile stress (kg/cm$^2$) | 26 | 22 | 20 | 16 | 19 | 30 | 29 | 29 | 25 | 22 |
| Hardness (points) | 67 | 65 | 62 | 61 | 62 | 70 | 69 | 68 | 65 | 63 |
| Heat aging test in a test tube (150° C. × 72 hrs) | | | | | | | | | | |
| % Change in tensile strength (%) | −62 | −60 | −20 | +30 | −4 | −19 | −12 | −7 | −4 | −16 |
| % Change in elongation (%) | −83 | −89 | −88 | −55 | −34 | −44 | −39 | −35 | −29 | −30 |
| Change in hardness (point) | +9 | +14 | +23 | +26 | +4 | +4 | +5 | +6 | +6 | +5 |
| JIS No. 3 oil immersion test (100° C. × 70 hrs) | | | | | | | | | | |
| % Change in volume (%) | +15 | +50 | +119 | +340 | +170 | +14 | +20 | +40 | +92 | +135 |
| % Change in tensile strength (%) | −11 | −42 | −64 | −76 | −75 | 0 | −11 | −20 | −41 | −61 |
| % Change in elongation (%) | 0 | −26 | −42 | −76 | −71 | −7 | −14 | −22 | −41 | −57 |
| Change in hardness (point) | −8 | −22 | −48 | −61 | −25 | −7 | −10 | −16 | −21 | −25 |
| Static ozone resistance test | | | | | | | | | | |
| 10 hours | C-4 | C-1 | NC | NC | NC | NC | NC | NC | NC | NC |
| 100 hours | broken | C-4 | NC | NC | NC | C-3 | NC | NC | NC | NC |
| 250 hours | | C-4 | NC | NC | NC | C-4 | B-1 | NC | NC | NC |
| 500 hours | | broken | NC | NC | NC | C-4 | B-3 | NC | NC | NC |
| 1000 hours | | | B-2 | NC | NC | C-4 | C-4 | NC | NC | NC |
| Dynamic ozone resistance test | | | | | | | | | | |
| 10 hours | B-3 | B-2 | NC | NC | NC | NC | NC | NC | NC | NC |
| 100 hours | C-4 | C-4 | A-3 | A-3 | NC | C-4 | A-1 | NC | NC | NC |
| 250 hours | broken | C-4 | C-4 | broken | NC | C-4 | B-3 | NC | NC | NC |
| 500 hours | | C-4 | C-4 | | NC | C-4 | B-4 | NC | NC | NC |
| 1000 hours | | C-4 | C-4 | | NC | C-4 | C-4 | NC | NC | NC |

It is seen from the results shown in Table 2 that the partially hydrogenated NBR/EPDM composition of this invention has the characteristics of the two copolymer rubbers, such as oil resistance and ozone resistance. It is also seen from FIGS. 1 and 2 that the rubber composition of this invention shows tensile strength ($T_B$) and heat resistance ($\Delta E_B$, percent change in elongation after a test tube aging test) higher than the additive properties obtained by the mixing of the two copolymer rubbers.

EXAMPLE 2

Partially hydrogenated NBR prepared in the same way as in Example 1 and having a bound acrylonitrile content of 33% by weight and a degree of hydrogenation of 45, 70 or 90% and each of the EPDM polymers shown in Table 3 were mixed on a cold roll to form a mixture in a mixing weight ratio of 70:30.

The mixture was blended on a cold roll with the various compounding agents shown in the compounding recipe of Table 1 to form a rubber compound stock. The stock was heated under pressure at 150° C. for 20 minutes to prepare a vulcanizate. The properties of the vulcanizate was measured in the same way as in Example 1. The results are shown in Table 4.

TABLE 3

| | EPDM | |
|---|---|---|
| Sample | Nonconjugated diene | Iodine value |
| A (*1) | Ethylidene norbornene | 24 |
| B (*2) | Ethylidene norbornene | 12 |
| C (*3) | Dicyclopentadiene | 20 |

Note:
(*1): MITSUI-EPT 4070, Mitsui Petrochemical Industries, Ltd.
(*2): ESPRENE 502, Sumitomo Chemical Co., Ltd.
(*3): ESPRENE 305, Sumitomo Chemical Co., Ltd.

TABLE 4

| | Run No. | | | | | | | | | | |
|---|---|---|---|---|---|---|---|---|---|---|---|
| | Comparison | | | | Invention | | | Comparison | | Invention | |
| Test item | 11 | 12 | 13 | 14 | 15 | 16 | 17 | 18 | 19 | 20 | 21 |
| NBR (degree of hydrogenation 45) | 100 | | | | 70 | | | | | | |
| NBR (degree of hydrogenation 70) | | 100 | | | | 70 | | | | | |
| NBR (degree of hydrogenation 90) | | | 100 | | | | 70 | | | 70 | 70 |
| Type | | | | A | A | A | A | B | C | B | C |
| EPDM | | | | | | | | | | | |
| Parts | | | | 100 | 30 | 30 | 30 | 100 | 100 | 30 | 30 |
| Tensile strength (kg/cm$^2$) | 166 | 170 | 212 | 127 | 145 | 175 | 206 | 106 | 117 | 185 | 189 |
| Elongation (%) | 450 | 460 | 460 | 400 | 400 | 420 | 440 | 460 | 450 | 420 | 430 |
| Hardness (point) | 69 | 69 | 69 | 62 | 68 | 68 | 68 | 63 | 63 | 67 | 67 |
| Heat aging test in a test tube (150° C. × 72 hours) | | | | | | | | | | | |
| % Change in tensile strength (%) | −55 | −30 | −20 | −5 | −50 | −14 | −8 | −5 | 0 | −10 | −13 |
| % Change in elongation (%) | −75 | −51 | −44 | −34 | −67 | −37 | −36 | −30 | −35 | −32 | −31 |
| Change in hardness (point) | +9 | +6 | +4 | +4 | +9 | +7 | +6 | +3 | +5 | +4 | +4 |
| JIS No. 3 oil immersion test (100° C. × 70 hrs) | | | | | | | | | | | |
| % Change in volume (%) | +15 | +15 | +14 | +170 | +45 | +46 | +45 | +175 | +176 | +45 | +45 |
| Dynamic ozone resistance test | | | | | | | | | | | |
| 10 hours | | B-3 | B-2 | NC | NC | NC | NC | NC | NC | NC | NC |
| 100 hours | | broken | C-4 | C-3 | NC | B-2 | NC | NC | NC | NC | NC |
| 500 hours | | | broken | C-4 | NC | C-4 | NC | NC | NC | NC | NC |

TABLE 4-continued

| Test item | Run No. | | | | | | | | | | |
|---|---|---|---|---|---|---|---|---|---|---|---|
| | Comparison | | | | Invention | | | Comparison | | Invention | |
| | 11 | 12 | 13 | 14 | 15 | 16 | 17 | 18 | 19 | 20 | 21 |
| 1000 hours | | | C-4 | NC | broken | NC | NC | NC | NC | NC | NC |

EXAMPLE 3

Seventy parts by weight of partially hydrogenated NBR prepared in the same way as in Example 1 and having a bound acrylonitrile content of 45% by weight and a degree of hydrogenation of 90% and 30 parts by weight of EPDM (MITSUI-EPT 4070) were mixed on a cold roll in accordance with the compounding recipe shown in Table 5 to form a compound stock. The stock was heated under pressure at 160° C. for 20 minutes to prepare a vulcanizate. The properties of the vulcanizate were measured in the same way as in Example 1. The results are shown in Table 6.

TABLE 5

| Compounding recipe | Run No. | | | | | | | | | |
|---|---|---|---|---|---|---|---|---|---|---|
| | Invention | | | | | | | Comparison | |
| | 22 | 23 | 24 | 25 | 26 | 27 | 28 | 29 | 30 | 31 |
| Partially hydrogenated NBR | 70 | | | | | | | | | |
| EPDM | 30 | | | | | | | | | |
| Stearic acid | 1 | | | ←Same as in Run No. 22→ | | | | | | |
| Zinc oxide | 5 | | | | | | | | | |
| SRF carbon black | 40 | | | | | | | | | |
| Sulfur | 0.5 | 0.5 | 0.5 | 1.5 | 1.5 | 1.5 | 0 | 0.5 | 1.5 | 1.5 |
| Tetramethylthiuram monosulfide | 1.5 | | | | | | | | | |
| Zinc dimethyldithiocarbamate | | 2.5 | | | | | 1.5 | 1.5 | | |
| Tetramethylthiuram monosulfide | | | 1.5 | | | | | | | |
| Tetraethylthiuram monosulfide | | | | 2.0 | | | | | | |
| Tetraethylthiuram monosulfide | | | | | 1.5 | | | | | |
| Zinc di-n-butyldithiocarbamate | | | | | | 2.5 | | | | |
| Cyclohexylbenzothiazyl sulfenamide | | | | | | | 1.5 | 1.5 | | |
| Dibenzothiazyl disulfide | 0.5 | 0.5 | | 0.5 | | | | | 1.5 | |
| 1,3-Diphenylguanidine | | | | | | | | | | 0.5 |
| 2-Mercaptobenzothiazole | | | 0.5 | | 0.5 | 0.5 | 0.5 | | | |
| Morpholine disulfide | | | | | | | 1.5 | | | |

TABLE 6

| Test item | Run No. | | | | | | | | | |
|---|---|---|---|---|---|---|---|---|---|---|
| | Invention | | | | | | | | Comparison | |
| | 22 | 23 | 24 | 25 | 26 | 27 | 28 | 29 | 30 | 31 |
| Properties in a normal condition | | | | | | | | | | |
| Tensile strength (kg/cm²) | 184 | 190 | 193 | 195 | 180 | 175 | 174 | 188 | 142 | 120 |
| Elongation (%) | 330 | 350 | 360 | 370 | 380 | 390 | 320 | 390 | 370 | 380 |
| Hardness (point) | 72 | 72 | 70 | 68 | 64 | 67 | 70 | 70 | 69 | 65 |
| Heat aging test in a test tube (150° C. × 71 hrs) | | | | | | | | | | |
| % Change in tensile strength (%) | −8 | −9 | −7 | 0 | +2 | −5 | −5 | −8 | +4 | −4 |
| % Change in elongation (%) | −37 | −36 | −34 | −40 | −42 | −40 | −32 | −35 | −43 | −45 |
| Change in hardness (point) | +6 | +6 | +6 | +8 | +8 | +7 | +7 | +6 | +8 | +8 |
| Dynamic ozone resistance test | | | | | | | | | | |
| 10 hours | NC | | | | | | | | NC | NC |
| 100 hours | NC | | | ←Same as in Run No. 22→ | | | | | NC | NC |
| 500 hours | NC | | | | | | | | broken | B-3 |
| 1000 hours | NC | | | | | | | | | broken |

It is seen from Table 6 that when vulcanizing accelerators outside the scope of this invention were used, co-valcanization could not be well effected, and the resulting products had inferior tensile strength and dynamic ozone resistance to the case of using the vulcanization accelerators within the scope of this invention.

What we claim is:

1. A rubber composition co-vulcanizable with a sulfur cure system, said composition comprising
    (1) 95 to 20% by weight of a partially hydrogenated unsaturated nitrile-conjugated diene copolymer rubber in which at least 50% of units derived from the conjugated diene are hydrogenated.
    (2) 5 to 80% by weight of an ethylene-propylene-nonconjugated diene terpolymer rubber, and
    (3) a required amount of at least one vulcanization accelerator selected from the group of thiuram accelerators and dithiocarbamate accelerators.

2. The composition of claim 1 wherein the copolymer rubber (1) is a partially hydrogenated unsaturated nitrile-conjugated diene copolymer rubber in which 70 to 98% of units derived from the conjugated diene are hydrogenated.

3. The composition of claim 1 wherein the copolymer rubber (1) contains 10 to 60% by weight of bound unsaturated nitrile.

4. The composition of claim 1 wherein the terpolymer rubber (2) consists of 20 to 90% by weight of ethylene, 10 to 80% by weight of propylene and 2 to 25% by weight of the nonconjugated diene.

5. The composition of claim 1 wherein the amount of the vulcanization accelerator (3) is 0.1 to 10 parts by weight per 100 parts by weight of the copolymer rubber (1) and the terpolymer rubber (2) combined.

* * * * *